United States Patent
Kitamura

(10) Patent No.: US 10,495,743 B2
(45) Date of Patent: Dec. 3, 2019

(54) DIRECTION ERROR DETECTION METHOD AND APPARATUS USING ESTIMATED DIRECTIONS, AND IN-VEHICLE RADAR APPARATUS

(71) Applicant: DENSO CORPORATION, Kariya, Aichi-pref. (JP)

(72) Inventor: Takayuki Kitamura, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 300 days.

(21) Appl. No.: 15/539,109

(22) PCT Filed: Dec. 22, 2015

(86) PCT No.: PCT/JP2015/085768
§ 371 (c)(1),
(2) Date: Jun. 22, 2017

(87) PCT Pub. No.: WO2016/104472
PCT Pub. Date: Jun. 30, 2016

(65) Prior Publication Data
US 2018/0156909 A1  Jun. 7, 2018

(30) Foreign Application Priority Data
Dec. 24, 2014  (JP) .................. 2014-260584

(51) Int. Cl.
*G01S 13/34* (2006.01)
*G01S 7/35* (2006.01)
(Continued)

(52) U.S. Cl.
CPC ............... *G01S 13/34* (2013.01); *G01S 7/35* (2013.01); *G01S 7/4026* (2013.01);
(Continued)

(58) Field of Classification Search
CPC ......... G01S 13/34; G01S 7/35; G01S 7/4026; G01S 13/931; H01Q 1/3233
(Continued)

(56) References Cited

U.S. PATENT DOCUMENTS

| 2009/0140912 A1* | 6/2009 | Kato ................ G01S 7/35 342/70 |
| 2012/0268313 A1* | 10/2012 | Shimizu ........... G01S 7/412 342/107 |

(Continued)

FOREIGN PATENT DOCUMENTS

| JP | H09-218257 | 8/1997 |
| JP | 2009-103456 A | 5/2009 |

*Primary Examiner* — Harry K Liu
(74) *Attorney, Agent, or Firm* — Knobbe, Martens, Olson & Bear, LLP

(57) ABSTRACT

A method of detecting direction errors of an object, applied to an in-vehicle radar apparatus, whereby in a first step, relative speeds of an object reflecting a continuous wave are obtained by executing frequency analysis of signals acquired by transmitting and receiving the continuous wave. In a second step estimated directions, which are values of estimated directions in which the object is present, are calculated for each of respective frequency bins in which the presence of the object has been confirmed by the frequency analysis executed in the first step. In a third step a theoretical curve is calculated which expresses a relationship between relative speed of a stationary object and directions in which the stationary object is present, with respect to the own vehicle. In a fourth step, the direction errors are obtained as errors of the estimated directions with respect to the theoretical curve.

5 Claims, 9 Drawing Sheets

(51) Int. Cl.
*G01S 13/93* (2006.01)
*H01Q 1/32* (2006.01)
*G01S 7/40* (2006.01)
*G08G 1/16* (2006.01)

(52) U.S. Cl.
CPC ......... *G01S 13/931* (2013.01); *H01Q 1/3233* (2013.01); *G01S 2007/403* (2013.01); *G01S 2013/9389* (2013.01); *G08G 1/165* (2013.01)

(58) Field of Classification Search
USPC ....................................................... 342/350
See application file for complete search history.

(56) References Cited

U.S. PATENT DOCUMENTS

| 2013/0307718 | A1* | 11/2013 | Aoki ...................... | G01S 13/50 |
| | | | | 342/61 |
| 2014/0145871 | A1* | 5/2014 | Asanuma ................ | G01S 7/354 |
| | | | | 342/128 |
| 2014/0247180 | A1* | 9/2014 | Moriuchi .................. | G01S 7/41 |
| | | | | 342/70 |
| 2015/0226838 | A1* | 8/2015 | Hayakawa ........... | H01Q 1/3233 |
| | | | | 342/70 |

* cited by examiner

FIG.8
(a)
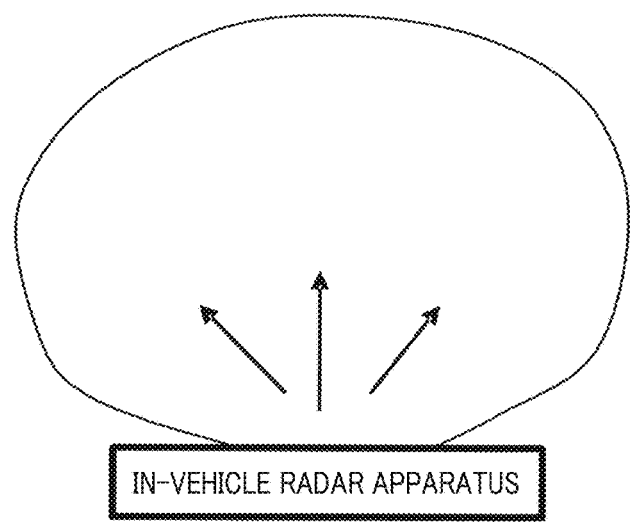
(b)
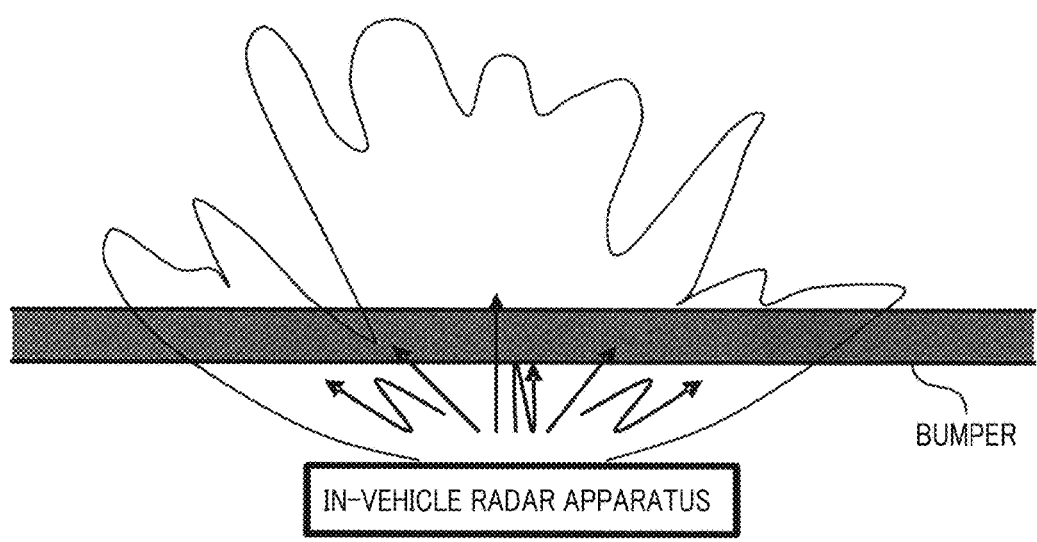

DIRECTION ERROR DETECTION METHOD AND APPARATUS USING ESTIMATED DIRECTIONS, AND IN-VEHICLE RADAR APPARATUS

CROSS-REFERENCE TO RELATED APPLICATION

This application is based on and claims the benefit of priority from earlier Japanese Patent Application No. 2014-260584 filed Dec. 24, 2014, the description of which is incorporated herein by reference.

BACKGROUND OF THE INVENTION

Technical Field

The present disclosure relates to technology for direction detection using electromagnetic waves.

Background Art

In the prior art, a radar apparatus is known which is installed in a vehicle and detects obstacles in the surroundings of the vehicle. For example with the technology described in Japan Patent Publication No. 2009-103456, the apparatus is mounted in a bumper of the vehicle (see Patent Document 1).

PRIOR ART LITERATURE

Patent Literature

[Patent Document 1] Japan Patent Publication No. 2009-103456

However if the antenna of the radar apparatus is installed in a bumper, multiple reflections of the electromagnetic waves are caused by the bumper, and as shown in FIGS. 8 and 9, the problem arises that the radiation characteristics of the antenna are disturbed, and there is a deterioration of the performance in detecting the direction of an object.

SUMMARY OF THE INVENTION

The apparatus of the present disclosure has been envisaged in view of these problems, and aims to provide technology for detecting direction errors caused by disturbance of the radiation characteristics of the antenna, and furthermore to provide technology for improving performance in detecting directions.

The direction error detection method of the present disclosure is applied to an in-vehicle radar apparatus which is installed in the bumper of a vehicle and detects at least the direction of an object, by using a continuous wave. The method consists of a first step through a fourth step.

In the first step, relative speeds with respect to an object which reflected the continuous wave are acquired, by frequency analysis of signals obtained by transmitting and receiving the continuous wave. In the second step, respective estimated directions are obtained for each of the frequency bins in which the existence of the object has been recognized by the frequency analysis performed in the first step, where each estimated direction is an estimated value of a direction in which the object is present. In the third step, a theoretical curve is calculated which represents a relationship between relative speeds of a stationary object and directions in which the stationary object is present, with respect to the own vehicle. In the fourth step, direction errors are derived using the estimated directions obtained for the stationary object. The direction errors are errors in the estimated directions obtained for the reflecting object, in relation to the theoretical curve.

Furthermore the direction error detection apparatus according to the present disclosure includes a relative speed calculation section for executing the processing of the first step, a direction estimation section for executing the processing of the second step, a theoretical curve calculation section for executing the processing of the third step, and an error calculation section for executing the processing of the fourth step.

That is to say, with the apparatus according to the present disclosure, a theoretical curve is derived which expresses a relationship between values of relative speed of the own vehicle with respect to a stationary object and directions, relative to the own vehicle, in which the stationary object is present. In addition, a relationship is obtained between values of relative speed of the own vehicle relative to an object which has reflected radar waves consisting of a continuous wave, and the arrival directions of the reflected waves. These two relationships are compared, to obtain direction errors. With such a configuration, direction errors of an existing CW radar (Continuous Wave radar) apparatus, caused by effects of a bumper, can be obtained. Since it is unnecessary to provide additional devices, the method of the present disclosure can be easily applied to an existing apparatus.

An in-vehicle radar apparatus according to the present disclosure includes a direction error detection section, a correction value calculation section, and a direction correction section. The correction value calculation section calculates an error correction value for each of respective frequency bins, by applying statistical processing to direction errors obtained by the error calculation section. The direction correcting section uses the error correction values to correct directions that are estimated by the direction estimating section.

According to such a configuration in the present disclosure, a direction detection error that is based on disturbance of the radiation characteristics of an antenna, etc., can be suppressed, and hence the detection accuracy can be enhanced.

The signs shown in parentheses in the claims indicate a relationship to basic means specified in an embodiment that is described hereinafter, and do not limit the technical scope of the present disclosure.

BRIEF DESCRIPTION OF THE DRAWINGS

In the accompanying drawings:

FIGS. 8a and 8b are conceptual diagrams, with FIG. 8a showing an example of the original directionality of an antenna and FIG. 8b showing the directionality when disturbed by a bumper.

DETAILED DESCRIPTION OF THE PREFERRED EMBODIMENTS

Figure 1:
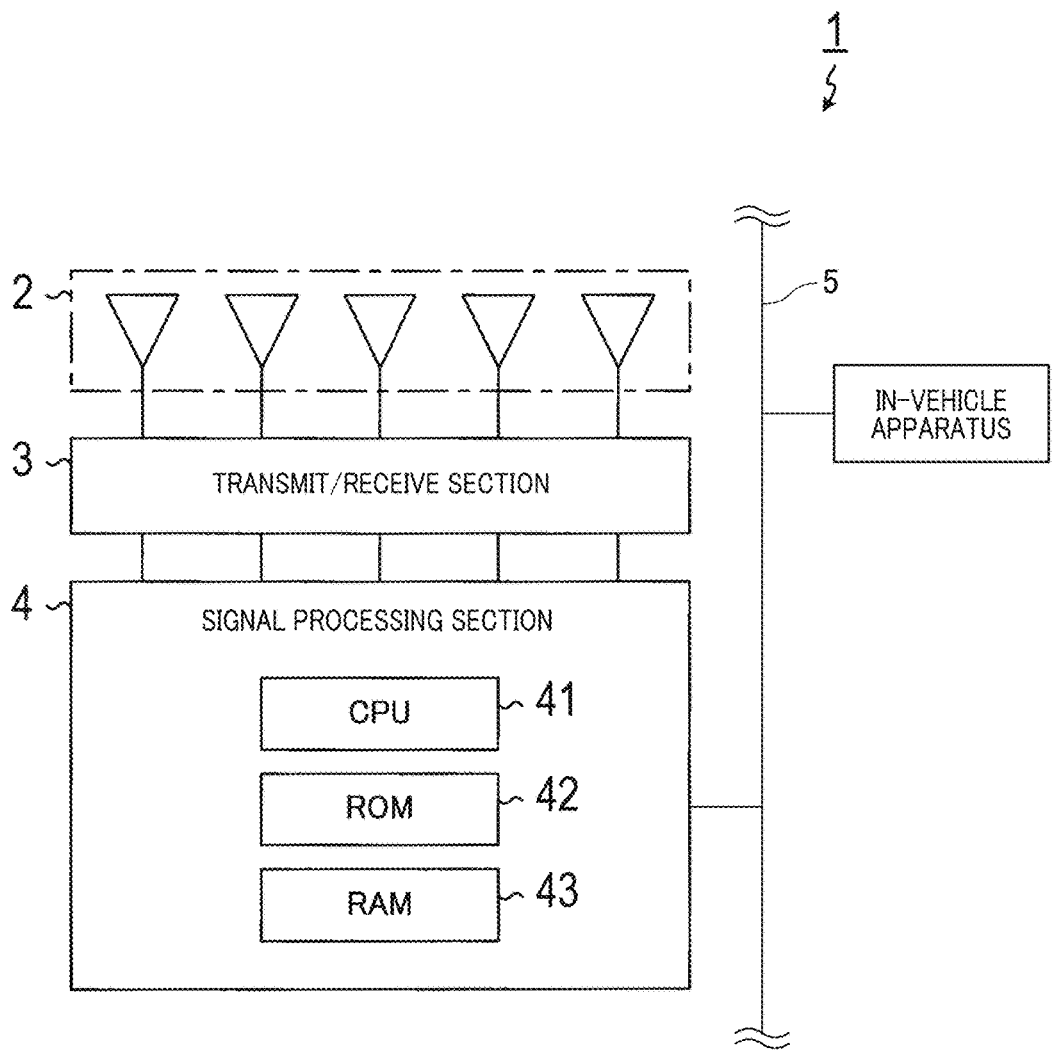
FIG. 1 is a block diagram showing the configuration of an in-vehicle radar apparatus.

Examples of the apparatus of the present disclosure are described in the following, referring to the drawings.

[Configuration]

The in-vehicle radar apparatus 1 shown in FIG. 1 includes an antenna section 2, a transmit/receive section 3, and a signal processing section 4, and is installed in a bumper which is formed of a material that passes electromagnetic waves. The radar apparatus 1 is installed near the right-side end of a rear bumper of the vehicle, with respect to the advancement direction, and is mounted facing in a direction such that the scanning range contains a region at a side of the vehicle (see FIG. 4). In addition, the in-vehicle radar apparatus 1 is connected for communication with other in-vehicle devices, via an in-vehicle LAN 5 shown in FIG. 1, i.e., an in-vehicle local area network.

As shown in FIG. 1, the antenna section 2 includes a plurality of antennas, which are arrayed horizontally, and transmits and receives electromagnetic waves as radar waves.

The transmit/receive section 3 is a known type of apparatus, which periodically transmits and receives radar waves composed of a multiple-frequency CW (continuous wave) at fixed time intervals, via the antenna section 2. Together with this, the transmit/receive section 3 receives the respective signals received by each of the antennas which constitute the antenna section 2, generates a beat signal as the difference signal between each received signal and the transmission signal, and supplies these beat signals together with the A/D converted received data to the signal processing section 4. The multiple-frequency CW consists of a plurality of continuous waves at frequencies of the order of GHz, respectively differing in frequency by approximately 1 MHz.

The signal processing section 4 consists of a known type of microcomputer, mainly composed of a CPU 41, a ROM 42, and a RAM 43, and executes at least main processing in accordance with a program stored in the ROM for detecting objects which reflect the radar waves. It should be noted that part of the RAM 43 consists of a nonvolatile memory in which the contents are retained even when the power supply of the in-vehicle radar apparatus 1 is turned off. The nonvolatile memory stores the relative speeds of detected objects (expressed here as frequency bins that have been derived by frequency analysis), and a direction correction table which expresses a correspondence relationship between these relative speeds and direction errors.

[Processing]

Figure 2:
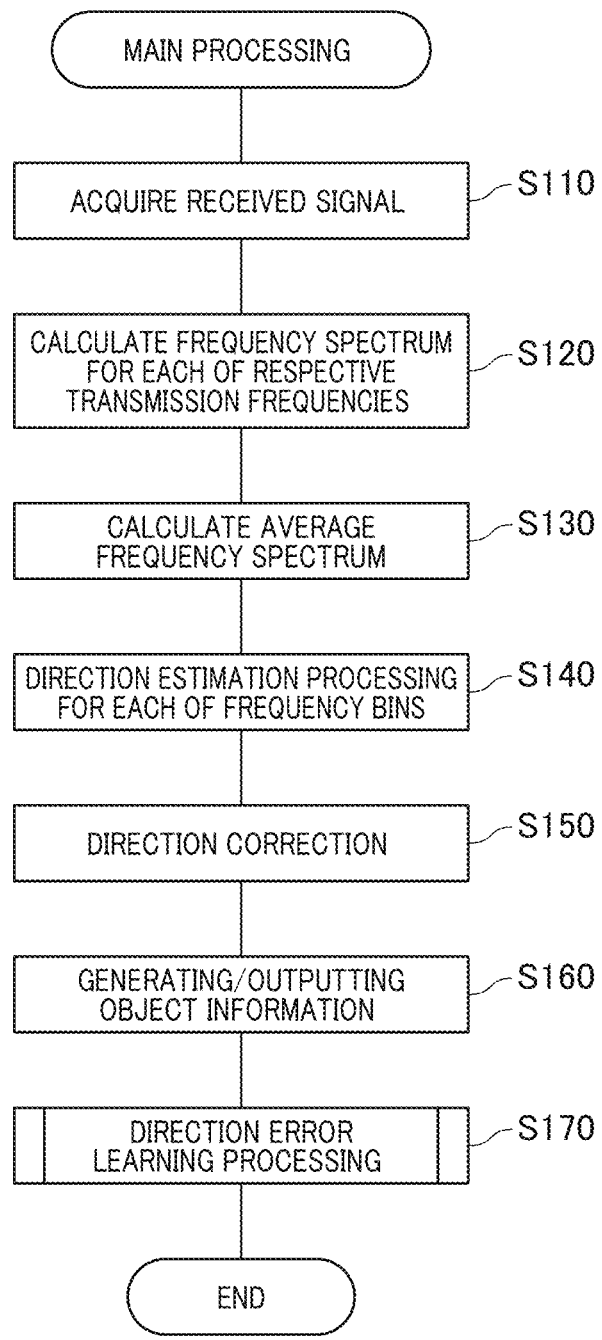
FIG. 2 is a flow diagram of a main processing.

The main processing executed by the CPU 41 of the signal processing section 4 will next be described, referring to the flowchart of FIG. 2. This processing is commenced in each of respective measurement cycles, in which radar waves are transmitted and received.

When this processing is commenced, at S110, the CPU 41 of the signal processing section 4 acquires sampling data of the beat signals of one measurement cycle, obtained through transmitting and receiving radar waves by the transmit/receive section 3. Sampling data for all transmission frequencies of the multiple-frequency CW are acquired in each measurement cycle.

In S120, a frequency spectrum is calculated for each transmission frequency of the multiple-frequency CW and for each antenna constituting the antenna section 2, by frequency analysis of the sampling data. In this case the Fast Fourier Transform (FFT) is used to perform the frequency analysis. The frequency bins of the frequency spectrums which are thereby acquired indicate the relative speeds of objects that reflected the radar waves.

In S130, an average frequency spectrum is calculated for each of the antennas, based on the frequency spectrums obtained in S120.

In S140, those frequency bins which have a peak value of reception intensity that is equal to or greater than a predetermined threshold value are extracted from the average frequency spectrums, and direction estimation processing is executed for each of these frequency bins. The direction estimation processing is preferably performed by high precision estimation process such as MUSIC (Multiple Signal Classification), however it would be possible to utilize beamforming, etc.

A direction correction table is stored in the RAM 43. In S150, the directions which have been estimated in S140 (hereinafter referred to as "estimated directions") are corrected using the direction correction table. Specifically, direction errors are obtained from the direction correction table, using as an index the frequency bins which were the object of direction estimation, and correction is performed by adding the acquired direction errors to the estimated directions.

In S160, for each object whereby a peak is generated in an average frequency spectrum, object information is generated which includes at least the relative speed of the object and the direction in which the object is located, and is supplied via the in-vehicle LAN 5 to each in-vehicle apparatus which uses the object information.

In S170, using the processing results from the preceding S130 and S140 above, direction error learning processing is executed for learning the direction error and for updating the direction correction table. This processing is then ended.

Figure 3:
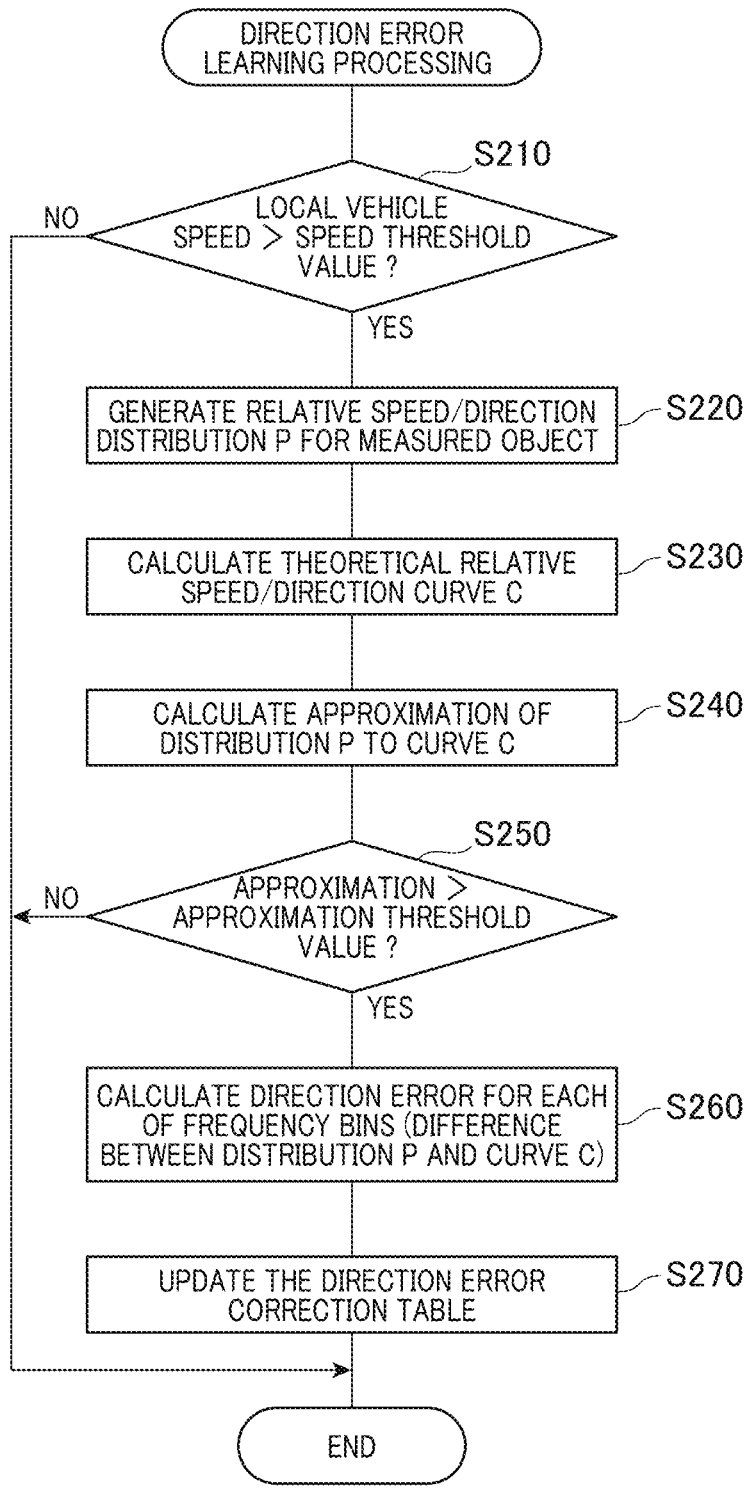
FIG. 3 is a flow diagram of a direction error learning processing.

Details of the direction error learning processing will next be described referring to the flowchart of FIG. 3.

When the direction error learning processing is commenced, in S210, the CPU 41 of the signal processing section 4 acquires the speed of the own vehicle via the in-vehicle LAN 5, and judges whether or not that speed exceeds a predetermined speed threshold. The speed threshold value is set as a value such that a graph (see FIG. 6) representing the relationship between the estimated directions calculated in S140 and the relative speeds of the objects that reflect the radar waves has a sufficiently large degree of slope.

If the own vehicle speed is higher than the speed threshold (S210: YES), the processing proceeds to S220. If the speed of the own vehicle is equal to or less than the speed threshold (S210: NO), it is judged that a learning effect cannot be expected, and this processing is then ended.

In S220, based on the processing results obtained in S130 and S140, a distribution P of two-dimensional data is generated. These data are composed of the relative speeds and estimated direction, with respect to the own vehicle, of an object which reflected the radar waves.

In S230, a theoretical curve C is calculated in accordance with the speed Vself of the own vehicle, using equation (1).

In equation (1), the curve C represents a relationship between the relative speed y and direction x detected for a stationary object. θinst is the installation angle of the in-vehicle radar apparatus 1, A is a constant, and N_FFT_BIN is the number of FFT points (for example, 256).

[Equation 1]

$$x = a\cos\left(\frac{-A(y - \text{N\_FFT\_BIN}/2)}{V_{self}}\right) + 90 - \theta_{inst} \quad (1)$$

In S240, the degree of approximation of the distribution P to the theoretical curve C is calculated, using a known statistical method.

In S250, a decision is made as to whether or not the degree of approximation obtained in S240 exceeds a predetermined approximation threshold. If the degree of approximation is greater than the approximation threshold value (S250: YES), the processing proceeds to S260. If the approximation degree is equal to or less than the approximation threshold value (S250: NO), it is judged that the object reflecting the radar wave is not a stationary object.

In S260, respective direction errors are calculated for each of the frequency bins of the data constituting the distribution P.

In S270, the direction correction table is updated using the direction error obtained in S260, and the present processing is terminated. Specifically, for example, the updating may be performed by weighted addition of the currently obtained direction error to the stored contents of the direction correction table.

[Principles]

The direction correction table is generated by using the fact that, when an object which reflects the radar waves is a stationary object and is at a sideward position, there is a correspondence relationship between the relative speed of the object and the direction in which the object is located.

That is, when there is a stationary object such as a wall surface at a side of the vehicle, reflected waves are acquired from various parts of the wall surface. The directions to the positions of the reflection points on the wall surface, and the relative speeds detected for the reflection points, have the relationship shown in FIG. 5. That is, if a reflection point is located directly laterally with respect to the position at which the in-vehicle radar apparatus 1 is attached (i.e., the reflection point is positioned at 90° with respect to the travel direction of the vehicle), then the relative speed of that reflection point is 0. The relative speed of a reflection point that is located on the vehicle travel direction side, with respect to the directly lateral position, takes a positive value, which indicates that this reflection point is approaching the vehicle. The relative speed of a reflection point which is located opposite the vehicle travel direction side, with respect to the directly lateral position, takes a negative value, which indicates that this reflection point is moving away from the vehicle.

In either case, the absolute value of the relative speed increases in accordance with increasing distance of the reflection point from the directly lateral position. In addition, the graph has line symmetry for directions to the rear of the own vehicle.

The search range of the in-vehicle radar apparatus 1 is set as 0-180 [deg]. As viewed from above, when the in-vehicle radar apparatus is attached at an inclination θinst [deg], the 0 [deg] direction of the search range is rotated clockwise by θinst [deg] from the rearward direction of the vehicle, and the directly lateral direction of the vehicle is 90+θinst [deg]. The case of θinst=50 [deg] is shown in the diagram.

Figure 4:
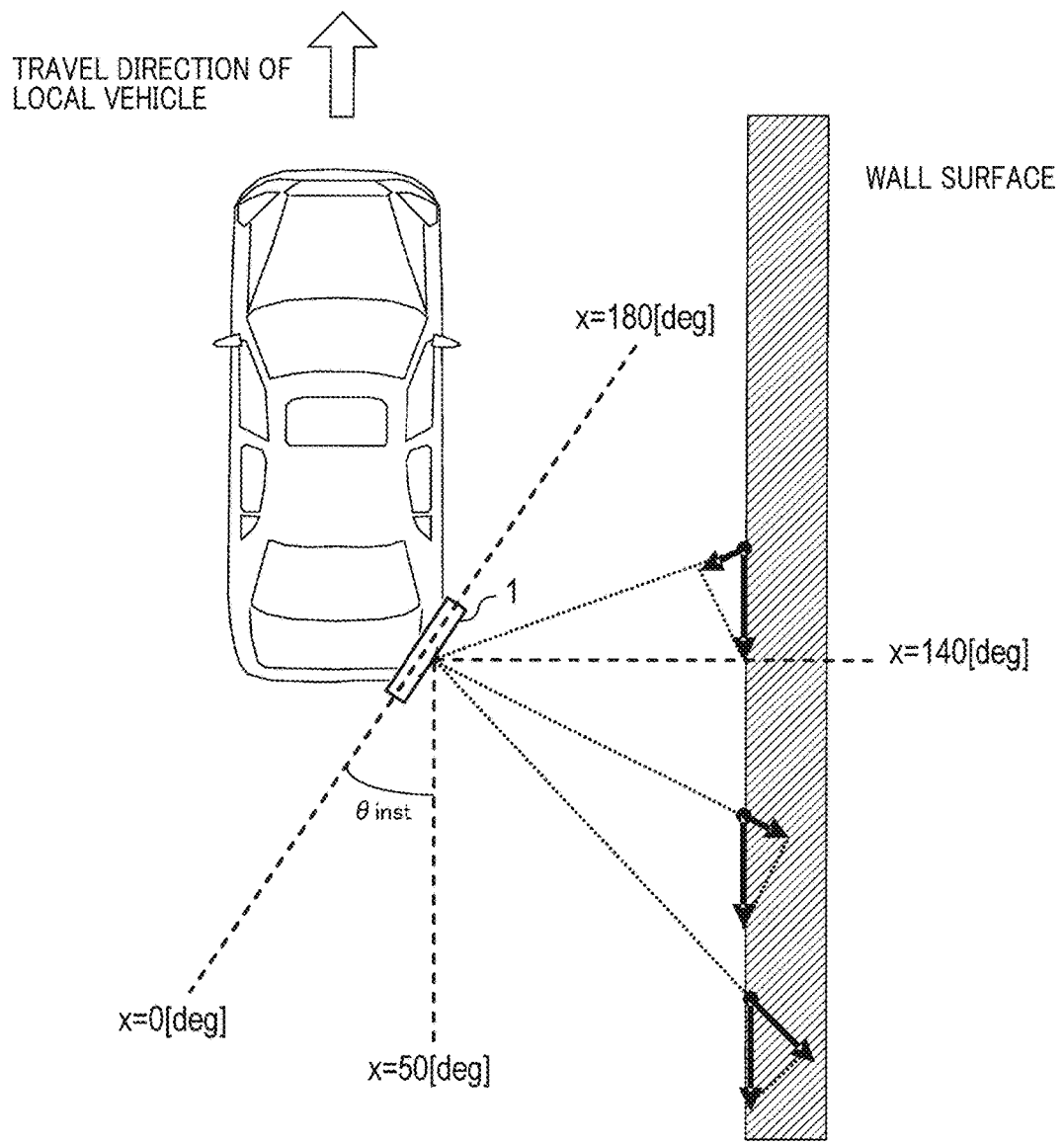
FIG. 4 is an explanatory diagram showing detection of relative speeds and directions with respect to a sideward-positioned stationary object.
Figure 5:
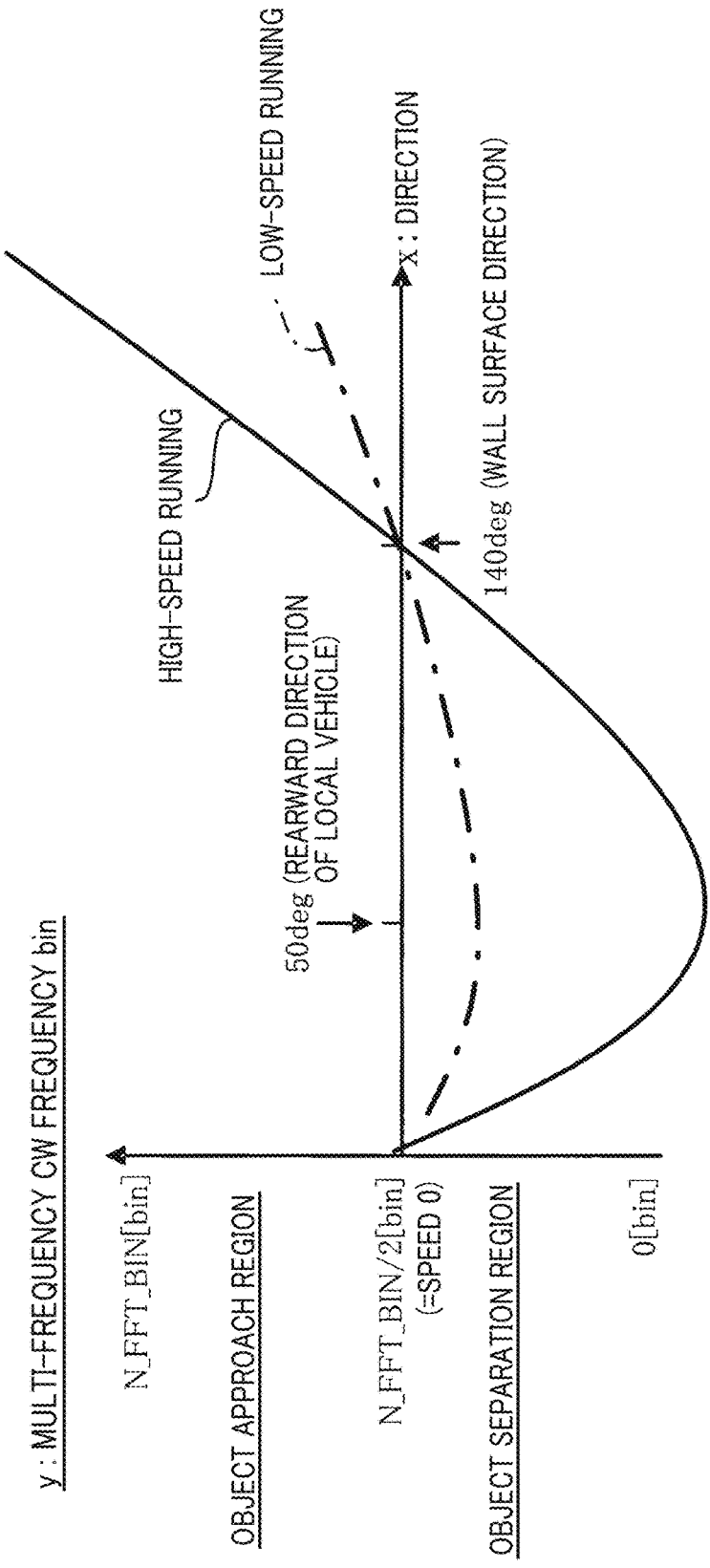
FIG. 5 is an explanatory diagram showing the form of variation of a theoretical curve in accordance with speed of the own vehicle.

The theoretical curve C shown in FIG. 5, obtained by using equation (1), is derived on the assumption that the installation condition is as in FIG. 4. In the theoretical curve C, as shown in the diagram, the variation of relative speed (frequency bin) with respect to direction is small when the speed Vself of the own vehicle is low, while the higher the speed Vself becomes, the greater becomes the variation. The frequency bins expressing relative speed are represented by 0–N_FFT_BIN [bin]. The central bin, N_FFT_BIN/2 [bin] is the case in which the relative speed is zero. In this case, N_FFT_BIN/2–N_FFT_BIN [bin] is a target approach area, in which the own vehicle is observed to approach a stationary object, while 0–N_FFT_BIN/2 [bin] is a target separation area, in which the own vehicle is observed to move away from the stationary object.

Figure 6:
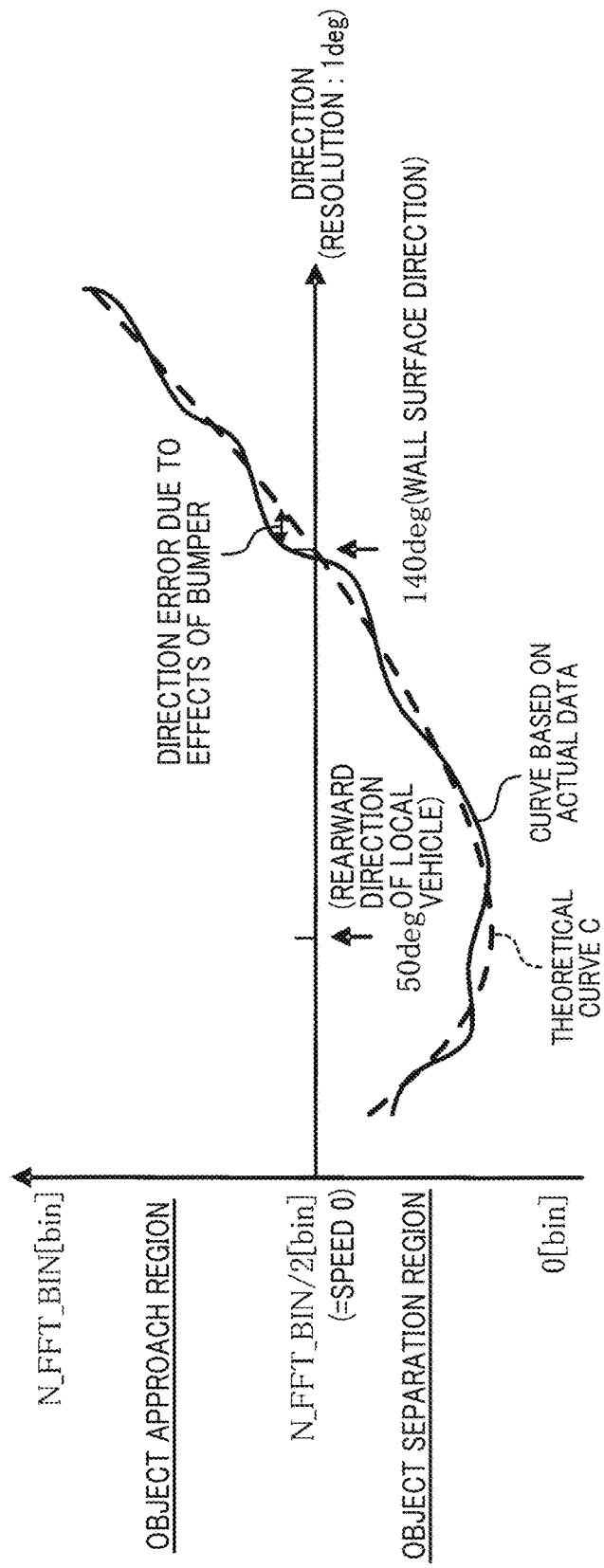
FIG. 6 is an explanatory diagram showing a theoretical curve expressing theoretical values of a relationship between detected values of relative speed and direction, and showing direction errors.

In FIG. 6, the dotted line is the theoretical curve C, and the solid line is a curve representing the actual data distribution P, obtained using well-known statistical methods. Differences between the theoretical curve C and the curve based on the distribution P, along the direction axis (the left-right direction in the figure) are direction errors, caused by the influence of the bumper, etc.

Figure 7:
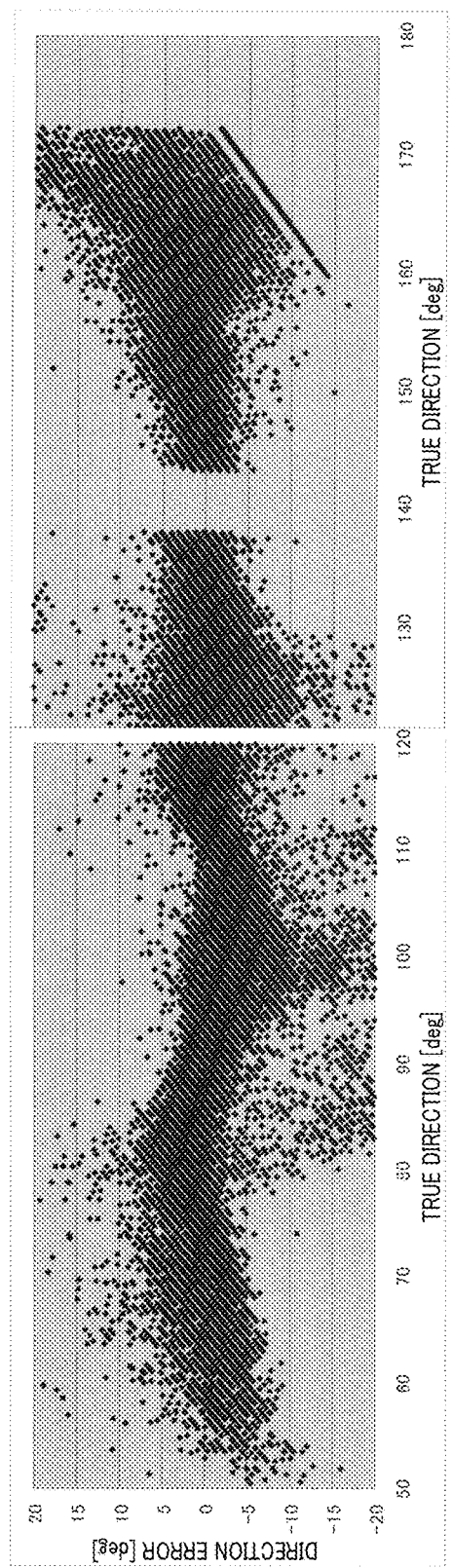
FIG. 7 is a graph showing measurement results of direction errors plotted in correspondence with actual directions.
Figure 9:
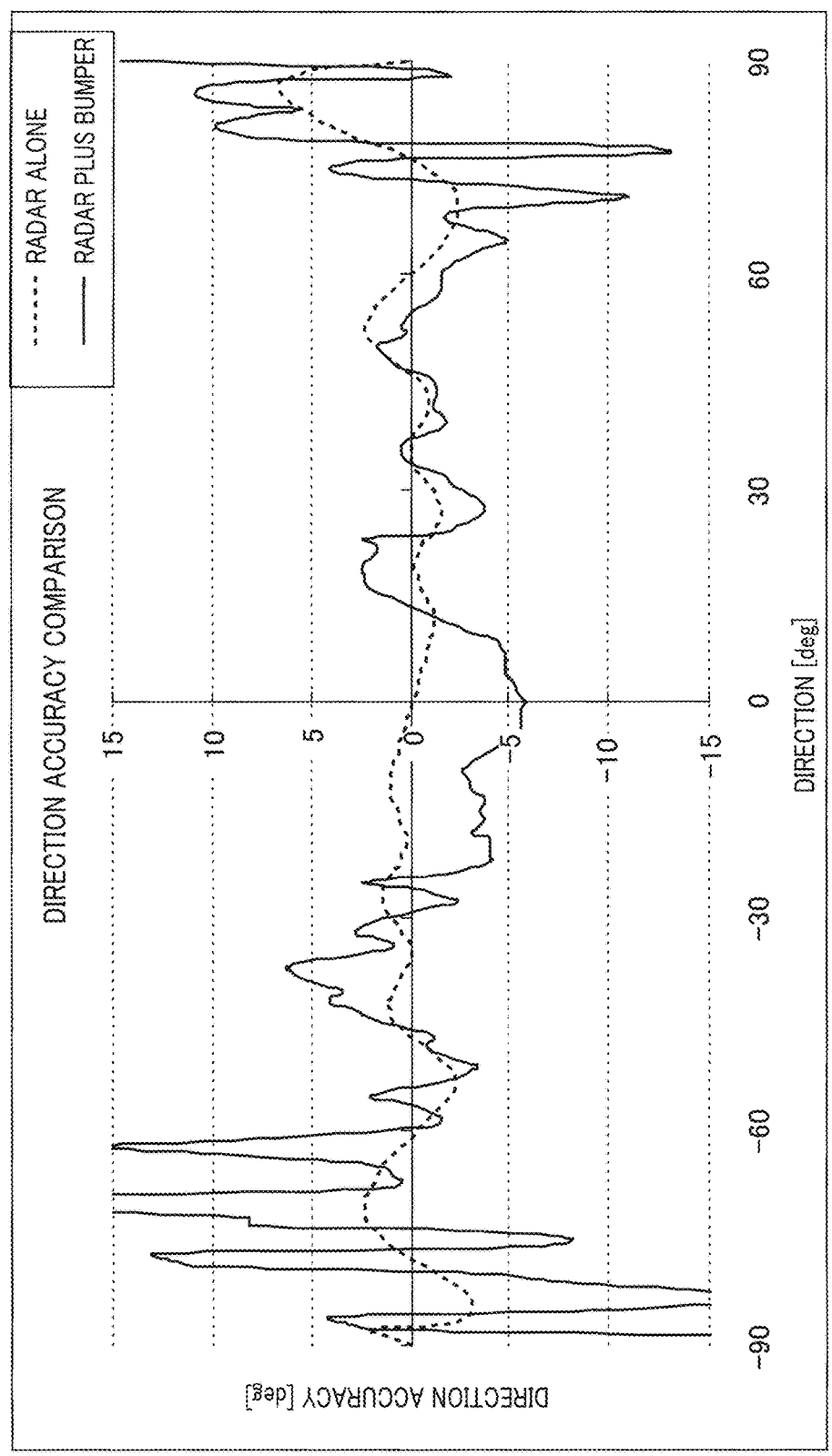
FIG. 9 is a graph showing the original radiation characteristic of an antenna, and the radiation characteristic when disturbed by a bumper.

FIG. 7 shows measured values of direction error plotted against true direction, for each direction within the search range. It can be seen that the distribution of the measured values is substantially centered on a direction error of 0. Measured values in the vicinity of 140 [deg] are excluded, since their measurement accuracy is low. That is to say, with a CW radar, it is theoretically impossible to measure an object having a relative speed of zero, and measurement accuracy in the vicinity of a relative speed of zero is also low.

[Effect]

As described above, with the in-vehicle radar apparatus 1, a theoretical curve C expressing a relationship between relative speed and direction of a stationary object is derived from the speed Vself of the own vehicle, while also a distribution P expressing values of relative speed with respect to an object which reflects a continuous wave and of directions in which the object exists (arrival directions of the reflected wave) is obtained. By comparing the theoretical curve C and the distribution P, direction errors caused by the influence of the bumper are calculated, and based on the results, a direction correction table is generated for use in correcting detected directions.

In that way, the in-vehicle radar apparatus 1 can suppress direction detection errors caused by effects of the bumper. Furthermore, the direction detection accuracy can be improved. Moreover, since these results are realized by processing information that is acquired from an existing CW radar, without adding new structure, configuration of the preset disclosure can be easily applied to an existing apparatus.

Other Embodiments

An embodiment in the present disclosure is described in the above, however the present disclosure is not limited to the above embodiment, and various modified forms may be implemented.

(1) The above embodiment is configured such the direction correction table is updated anytime by means of learning, however it would be equally possible to use a direction correction table that has been generated beforehand, leaving the direction correction table unchanged, without updating.

(2) With the above embodiment, a judgement as to whether or not the distribution P is based on a stationary object is made on the basis of the degree of approximation of the distribution P to the theoretical curve C. However, it would be equally possible to perform the judgement by using information acquired from images from an in-vehicle camera, or from map data, etc.

(3) It would be equally possible to divide the functions of a single constituent element of the above embodiment among a plurality of constituent elements, or to combine the functions of a plurality of constituent elements in a single constituent element. Furthermore it would be equally possible to replace at least a part of the configuration of the above embodiment with a known configuration which has a similar function. Moreover it would be equally possible to omit a part of the configuration of the above embodiment. Furthermore it would be equally possible to add to or replace at least a part of the configuration of the above embodiment with another part of the embodiment. It should be noted that all forms which are contained in the technical concepts specified by the wording of the claimed inventive scope are embodiments of the present disclosure.

(4) In addition to a direction error detection method and a direction error detection apparatus, the present disclosure may be realized in various forms, including systems such as an in-vehicle radar apparatus, etc., having the direction error detection apparatus as a constituent element, a program for a computer to function as the direction error detection apparatus, a medium on which the program is recorded, etc.

DESCRIPTION OF SIGNS

1 . . . in-vehicle radar apparatus 2 . . . antenna section 3 . . . transmitting section 4 . . . signal receiving section

The invention claimed is:

1. A direction error detection method for a vehicle-mounted radar apparatus that is installed in a bumper of a vehicle, where the radar apparatus detects at least directions in which an object is present, by using a continuous wave, and the direction error correction method detects direction errors that arise due to effects of the bumper,
wherein the direction error correction method comprises:
a first step, of executing frequency analysis of signals that are acquired by transmitting and receiving the continuous wave, for obtaining relative speeds of an object which reflected the continuous wave;
a second step, of obtaining, for each of respective frequency bins in which the presence of the object is confirmed by the frequency analysis executed in the first step, an estimated direction that is an estimated value of a direction in which the object is present;
a third step, of calculating a theoretical curve expressing a relationship between speeds relative to a stationary object and directions in which the stationary object is present, with respect to an own vehicle; and
a fourth step, of using the directions obtained for the stationary object to acquire direction errors, which are errors in the estimated directions in relation to the theoretical curve.

2. The direction error detection apparatus according to claim 1, wherein
the error calculation section obtains a degree of approximation of a distribution of estimated directions obtained by the direction estimation section to the theoretical curve obtained by the theoretical curve calculation section, and when the degree of approximation exceeds a predetermined approximation value, judges that the estimated directions in the distribution are estimated directions of a stationary object.

3. A direction error detection apparatus for a vehicle-mounted radar apparatus that is installed in a bumper of a vehicle, where the radar apparatus detects at least a direction in which an object is located, by using a continuous wave, and the direction error detection apparatus detects a direction error that arises due to effects of the bumper,
wherein the direction error correction apparatus comprises:
a relative speed calculation section which executes frequency analysis of signals that are acquired by transmitting and receiving the continuous wave, for obtaining relative speeds of an object which reflected the continuous wave;
a direction estimation section which obtains, for each of respective frequency bins in which the presence of the object is confirmed by the frequency analysis executed in the relative speed calculation section, an estimated direction that is an estimated value of a direction in which the object is present;
a theoretical curve calculation section which calculates a theoretical curve expressing a relationship between speeds relative to a stationary object and directions in which the stationary object is present, with respect to the own vehicle; and
an error calculation section which uses the directions obtained for the stationary object to acquire direction errors, which are errors in the estimated directions in relation to the theoretical curve.

4. The direction error detection apparatus according to claim 3, wherein
a multi-frequency continuous wave is used as the continuous wave; and
the direction estimation section executes processing using averaging of results that are obtained by applying frequency analysis for each of respective frequencies of the continuous wave.

5. An in-vehicle radar apparatus comprising:
a direction error detection apparatus for a vehicle-mounted radar apparatus that is installed in a bumper of a vehicle, where the radar apparatus detects at least a direction in which an object is located, by using a continuous wave, and the direction error detection apparatus detects a direction error that arises due to effects of the bumper, wherein the direction error correction apparatus includes:
a relative speed calculation section which executes frequency analysis of signals that are acquired by transmitting and receiving the continuous wave, for obtaining relative speeds of an object which reflected the continuous wave,
a direction estimation section which obtains, for each of respective frequency bins in which the presence of the object is confirmed by the frequency analysis executed in the relative speed calculation section, an estimated direction that is an estimated value of a direction in which the object is present,
a theoretical curve calculation section which calculates a theoretical curve expressing a relationship between speeds relative to a stationary object and directions in which the stationary object is present, with respect to the own vehicle, and
an error calculation section which uses the directions obtained for the stationary object to acquire direction errors, which are errors in the estimated directions in relation to the theoretical curve;

a correction calculation section which obtains error correction values for each of respective frequency bins by executing statistical processing of direction errors obtained by the error calculation section; and a direction correction section which uses the error correction values to correct the directions that are estimated by the direction estimation section.

\* \* \* \* \*